(12) United States Patent
Antemijczuk et al.

(10) Patent No.: US 11,304,035 B1
(45) Date of Patent: Apr. 12, 2022

(54) METHOD AND SYSTEM TO SEAMLESSLY UPGRADE CLOUD-BASED CALL PROCESSING SERVICES

(71) Applicant: MOTOROLA SOLUTIONS, INC., Chicago, IL (US)

(72) Inventors: Pawel Antemijczuk, Soborg (DK); Fernando Casanova Galeano, Greve (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 7 days.

(21) Appl. No.: 17/101,264

(22) Filed: Nov. 23, 2020

(51) Int. Cl.
*H04W 4/08* (2009.01)
*H04L 67/562* (2022.01)
*H04W 4/10* (2009.01)

(52) U.S. Cl.
CPC .......... *H04W 4/08* (2013.01); *H04L 67/2809* (2013.01); *H04W 4/10* (2013.01)

(58) Field of Classification Search
CPC ........ H04W 4/08; H04W 4/10; H04W 76/45; H04L 67/2809
See application file for complete search history.

(56) References Cited

U.S. PATENT DOCUMENTS

| 7,831,974 | B2 | 11/2010 | Huston et al. | |
| 9,339,707 | B2 | 1/2016 | Borissov et al. | |
| 10,708,412 | B1* | 7/2020 | Killpack | G06F 30/18 |
| 10,880,722 | B1* | 12/2020 | McDonald | H04W 4/08 |
| 2005/0262254 | A1 | 11/2005 | Sherwani | |
| 2008/0004060 | A1* | 1/2008 | Suzuki | H04W 76/45 455/518 |
| 2009/0089813 | A1 | 4/2009 | Wihardja et al. | |
| 2012/0007945 | A1* | 1/2012 | Sun | H04N 7/148 348/E11.001 |

(Continued)

FOREIGN PATENT DOCUMENTS

| JP | 5571667 B2 | 8/2014 |
| WO | 2002044835 A2 | 6/2002 |

OTHER PUBLICATIONS

"What is container orchestration?" RedHat (https://www.redhat.com/en/topics/containers/what-is-container-orchestration) (Year: 2019).*

(Continued)

*Primary Examiner* — Raymond S Dean
(74) *Attorney, Agent, or Firm* — Barbara R. Doutre

(57) ABSTRACT

A method and system to preserve a group call state during a cloud-based call processing service upgrade is provided. Group call requests are queued through a message broker to instances of a call processing service. A cloud based database is selectively locked and unlocked by each instance of the call processing service as group call requests are processed with retrieved group call states A need to upgrade the call processing service is determined by an orchestration framework, which sends exit signals to current instances of the call processing service and starts new instances. In-progress group call requests are processed by their respective instances of the call processing service and acknowledgments are sent to a message broker upon completion. Unacknowledged group call requests are determined byte message broker and retransmitted to the new instances of the call processing service.

18 Claims, 4 Drawing Sheets

(56) References Cited

U.S. PATENT DOCUMENTS

2020/0137636 A1* 4/2020 Yang .................... H04W 76/27
2020/0186646 A1* 6/2020 Meyerowitz ............ H04W 4/90

OTHER PUBLICATIONS

Wikipedia: "Service satelessness principle", https://en.wikipedia.org/wiki/Service_statelessness_principle, downloaded from the internet: Oct. 26, 2020, all pages.

* cited by examiner

METHOD AND SYSTEM TO SEAMLESSLY UPGRADE CLOUD-BASED CALL PROCESSING SERVICES

BACKGROUND OF THE INVENTION

Communication systems provide communication between users on the system. Loss of service for users is bothersome and frustrating. In the case where the communication system is a public safety communication system, loss of service can be even more problematic. There are situations when core network equipment, such a call processing services (also known as the control plane), need to be upgraded. In current land mobile communication systems this can only be done in a manner in which a temporary loss of service during group calls. Next Generation cloud-based call processing provides multi-system, multi-tenant solutions that will be even more difficult to take down for maintenance of equipment upgrades.

Therefore a need exists for a method and system to provide the ability to upgrade call processing services in land mobile radio systems with zero downtime. An approach that could be applied to next generation cloud-based multi-tenant, multi-system communication systems would be highly beneficial.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description below, are incorporated in and form part of the specification and serve to further illustrate various exemplary embodiments of concepts that include the claimed invention, and to explain various principles and advantages of those exemplary embodiments.

Figure 1:
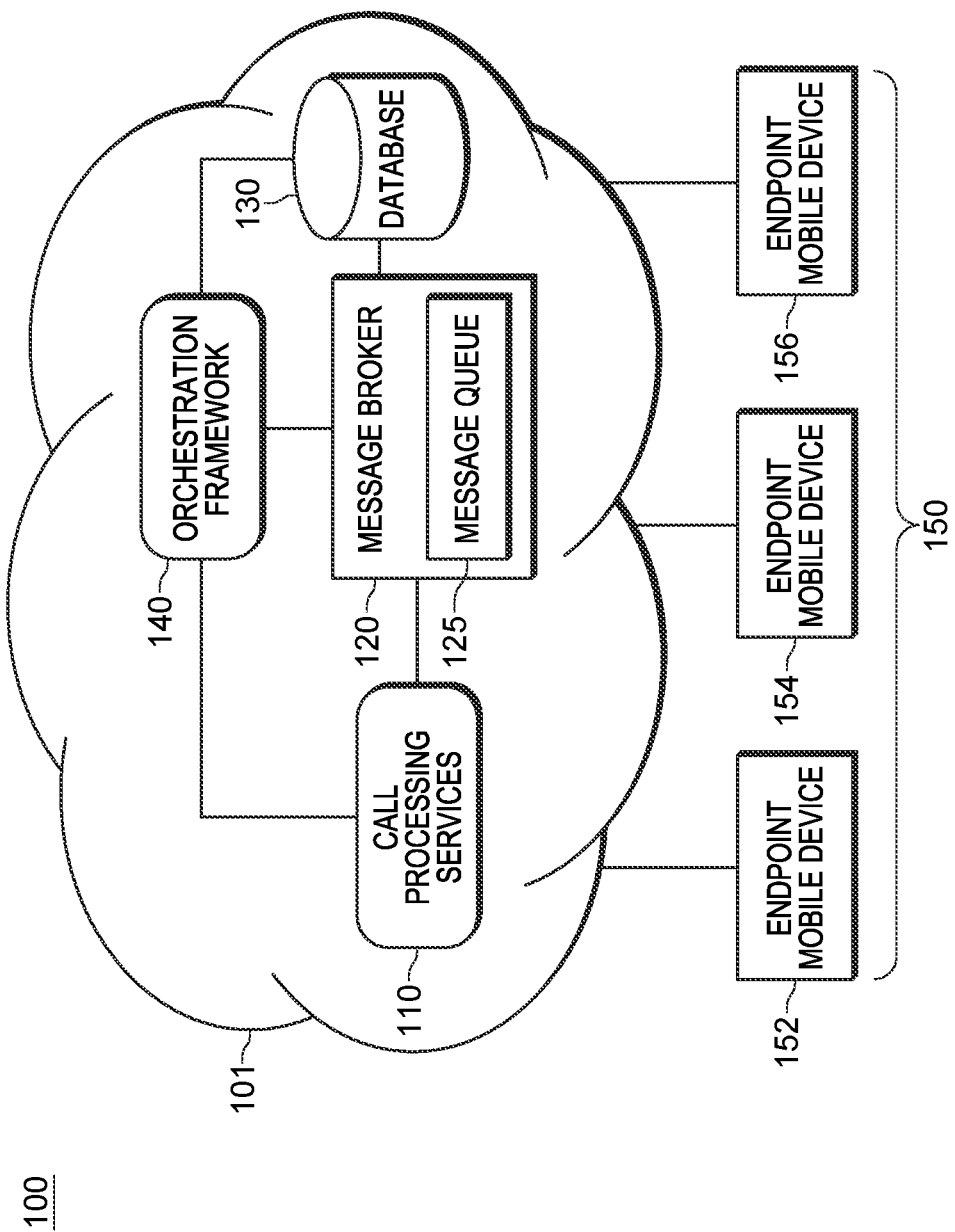
FIG. 1 is a block diagram of communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is provided herein a method and communication system to preserve a group call state during a cloud-based call processing service upgrade is provided. Group call requests are queued through a message broker to instances of a call processing service. A cloud based database is selectively locked and unlocked by each instance of the call processing service as group call requests are processed with retrieved group call states A need to upgrade the call processing service is determined by the orchestration framework, which sends exit signals to current instances of the call processing service and starts new instances. In-progress group call requests are processed by their respective instances of the call processing service and acknowledgments are sent to a message broker indicative of completion. Unacknowledged group call requests are detected at the message broker and retransmitted to the new instances of the call processing service.

FIG. 1 is a block diagram of a cloud based communication system 100 formed and operating in accordance with some embodiments. Communication system 100 comprises cloud based instances of a call processing service 110, a message broker 120 with message queue 125, and a database 130 all operating under a cloud based orchestration framework 140 and enabling communication with one or more endpoint devices 150, for example endpoint mobile devices 152, 154, 156. For group call, at least one endpoint, such as endpoint 152 is an endpoint which is requesting a group call with other endpoints.

The communication system 100 operates over radio frequency (RF) communications. The type of RF communications can vary, and can include an RF system of a single type or any combination of compatible RF systems. For example in FIG. 1, communication system 100 may be a land mobile radio (LMR) digital two-way radio communications system. LMR systems are well suited to operation in public safety environments, such as law enforcement, fire and/or medical rescue where maintaining group call communications and avoiding dropped communications to endpoint mobile devices 150 during service upgrades is extremely desirable. LMR systems operate mission critical voice and data in the 700 MHz, 800 MHz, 900 MHz, UHF and VHF bands for voice and data operation. While extremely desirable for service upgrades taking place during talkgroup applications in LMR systems, the improved upgrade capability provided by the embodiments described herein may also be applied to other systems such as long term evolution (LTE) systems that provide broadband access and group call services to subscriber endpoint devices. The call processing services 110 may further support converged systems (e.g. combined LMR and LTE devices) as well as multi-tenant, multi-system, and multi-technology, where group call is offered as a service.

Operating within cloud 101, the message broker 120 is a logical entity that maintains a set of queues 125, each queue storing requests to a given service, which for the purposes of this application is a group call request, such as a PTT talkgroup request. Such group call requests originate from an endpoint device, are sent and queued 125 at the broker 120. The group call request includes the ID of the user starting the call and the ID of the group that the user is trying to talk into. The broker 120 distributes the group call requests to call instances of the call processing service 110 in a round robin manner, thereby ensuring load balancing between instances.

The call processing services 110 are responsible for coordinating the start, maintenance and termination of group calls amongst endpoint devices 150. Each instance of call processing service 110 comprises internal processes which are configured for database connectivity with database 130. For a newly started call, call processing service handles checking the validity of the IDs, whether the user and the group are allowed to perform the requested operation, finding all endpoints that need to be involved in the call, ensuring that resources are available at those endpoints to receive the call, and sending the needed signaling to endpoints to start the call. For an already ongoing group call, call processing services 110 include checking whether new requests can interrupt any ongoing audio, updating the endpoints that have to participate in the call when users change from an affiliated talkgroup, and terminating calls. The system may process multiple calls to different talkgroups at the same time. Upgrades to call processing services may occur at any point during a newly started group call or already ongoing group call. A group call state summarizes all the information about an ongoing call on a talkgroup Group call states and updates to group call states are stored in database 130.

Whenever an instance of the call processing service 110 is processing a group call request, that instance will first apply a distributed lock in the database 130, thereby controlling access to the call states and preventing other instances from altering the state of the same call. The instance of call processing service 110 is configured to retrieve a group call state from the database 130 perform processing based on the group call request and then save the updated group call state back into the database and removes the lock. When a group call request is processed to completion the call processing service instance 110 will remove the database lock, acknowledge the request, and remove the request from the message broker's queue 125, thereby establishing group call amongst authorized participants. The locking and unlocking of the database 130 advantageously ensures that requests from the broker 120 are handled sequentially through the call processing services 110.

In accordance with the embodiments, the communication system 100 operates in a manner that preserves a group call state amongst endpoint devices 150 during a cloud-based call processing service upgrade. The orchestration framework 140 is a logical entity that determines whether any service within cloud 101 need to be upgraded. Briefly, a determination is made, by the orchestration framework 140, that an upgrade to the call processing services 110 is needed. Upgrades may include for example, rolling out a new feature in the system, such as group test for Cirrus and/or addressing a customer defect, to name a few. Performing such upgrades may now be performed without loss of service and push-to-talk (PTT) group call capability. The orchestration framework 140 starts new instances of the call processing services 110, where each new instance having its own internal processes. The new instances of call processing service join the round robin queue on the message broker 120. Old instances of the call processing service are terminated by the orchestration framework 140 in a graceful manner, by sending an exit signal to the old instances indicating shutdown. The exit signals are sent in response new instances of the call processing services reporting to the orchestration framework 140 that they are operational.

The internal processes of the old instances of call processing services are notified of the shut down, thereby triggering the old instances to finish handling in-progress requests and cease to consume new group call requests by disconnecting from the queue.

Acknowledgement is sent from the olds instances of call processing service 110 to the message broker 120 indicating that in-progress request have been handled. Internal consumer processes of the old instances signal to the message broker 120 that they stop consuming, and unacknowledged requests that may have been delivered are re-queued at the broker. The unacknowledged requests re-queued at the message broker 120 are then retransmitted from the broker to new instances of the call processing service 110, the new instance having been upgraded.

In accordance with some embodiments, the database lock enables having several instances of the call processing service operating in parallel, which, in turn, enables the seamless upgrade to the call processing services to take place. The combination of the database locking and storing group call states in the database 130 as well as message broker acknowledgements together allow for upgrades without message and service loss, thereby maintaining group call.

Figure 2:
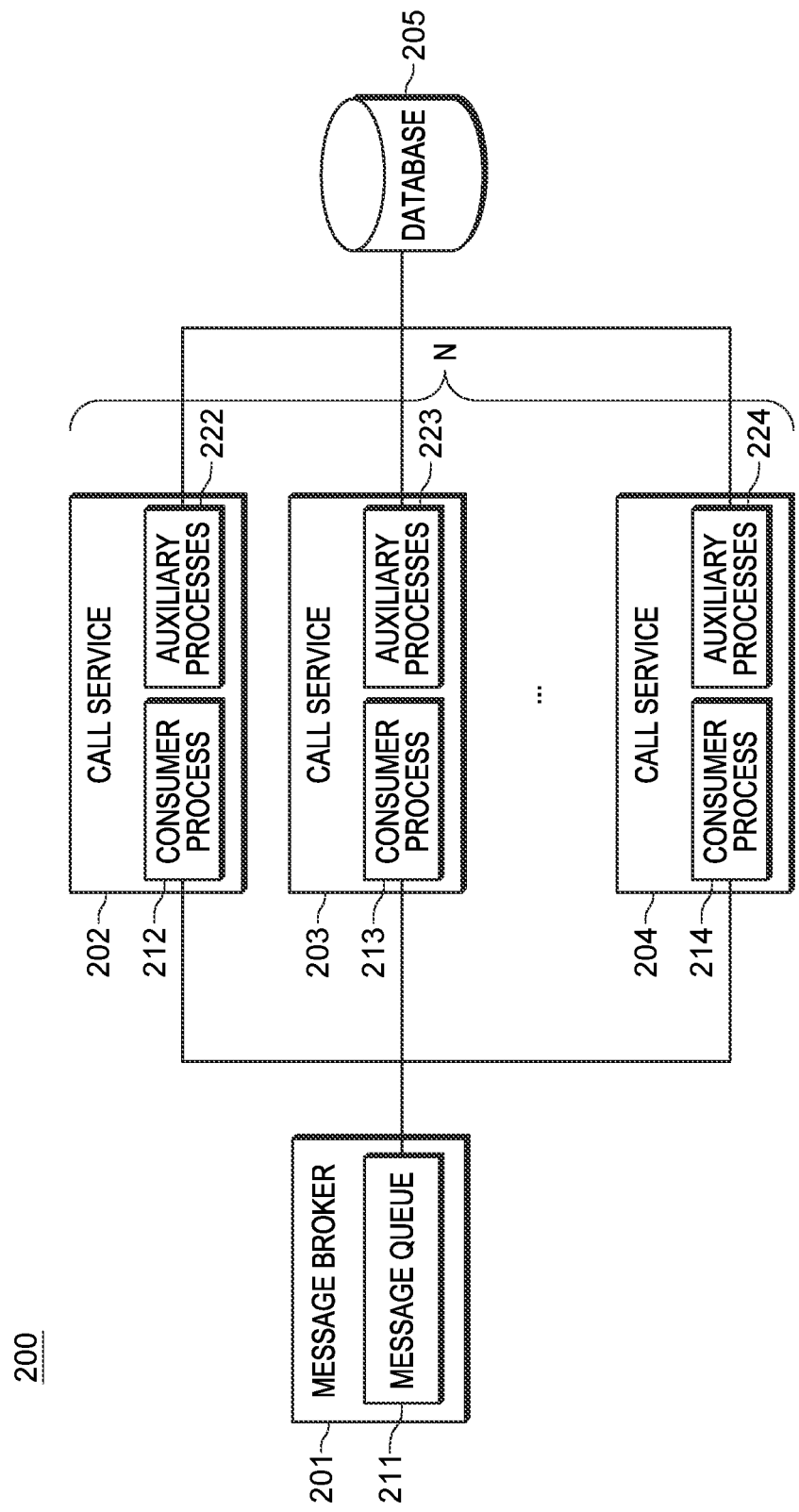
FIG. 2 is a more detailed view of the call processing service of FIG. 1 in accordance with some embodiments.

FIG. 2 is a more detailed view 200 of the call processing service of FIG. 1 in accordance with some embodiments. View 200 shows a message broker 201 having a message queue 211, N identical instances of a call processing service 202, 203, 204 in a container orchestration framework, such as a Kubertes orchestration framework, and a database 205. The instances of the call processing service 202, 203, 204 share the single queue 211 defined in the message broker 201. The call processing service is responsible for handling control plane messages, which for the purpose of this application, are group call requests, such as PTT group call requests.

Each instance of call processing services 202, 203, 204 has its own respective consumer process and auxiliary processes. FIG. 2 shows, as an example, call processing service 202 comprising consumer process 212 and auxiliary processes 222; call processing service 203 comprising consumer process 213 and auxiliary processes 223; and call processing service 204 comprising consumer process 214 and auxiliary processes 224. The number of identical instances of the call processing service shown in FIG. 2 is for example purposes and is not intended to limit the scope of the embodiments. The consumer processes and auxiliary processes of the instances are responsible for connectivity with database 205. For the purposes of this application the consumer process of each instance is a message consuming process for handling (i.e. processing) a group call request, while the auxiliary processes of each instance are responsible for locking the database 205, retrieving a group call state from the database, writing and storing an updated call state to the database and removing the lock to the database. The group call state, as mentioned previously, summarizes all the information about an ongoing call on a talkgroup.

The instances of the call processing service 202, 203, 204 handle group call requests. All instances of call processing service are connected to the same database 205. All instances can process call requests for any talkgroup. The lock control advantageously enables having different instances processing requests for the same talkgroup.

Whenever an instance of call processing service is processing a group call request, that instance will first create a distributed lock in the database 205, preventing other instances from altering the state of the same call, allowing that instance to retrieve the group call state from the database 205, perform processing, save the updated group call state back into the database and remove the lock. When a call is started on a talkgroup, a group call state is created and maintained throughout the duration of the call. A call is started with a group call request, and additional group call request may extend the duration of the call. After a period without group call request (also known as "hangtime" period), the call is terminated and the group call state is deleted. The group call state contains the information about the ongoing call such us, the identity of the device currently sourcing audio into the call, the endpoint that it is sourcing from and the endpoints that are to receive the audio).

When a group call request is processed to completion that instance of call processing service will then send an acknowledgement of that request to the message broker 201, removing that request from the message broker's queue 211. Unacknowledged group call requests are detected at the message broker and retransmitted to the new instances of the call processing service.

In accordance with the embodiments, when an upgrade of the call processing services 202, 203, 204 is performed, the orchestration framework will first start M (M<N) new instances of the call processing service. Once an upgrade is decided, all instances are upgraded. Each new instance will start its respective internal auxiliary processes, ensuring that new instance of call processing service is ready to handle a group call request. Each new instance of call processing service will start its respective internal consumer process, joining the round-robin queue on the message broker 201.

The orchestration framework will then terminate each of the M old instances of the call processing service. Each old instance of call processing service will receive an exit signal from the orchestration framework indicating shutdown. Each old instance of call processing service will process any in-progress group call requests to completion, acknowledging those requests to the message broker 201.

Each old instance of call processing service will process the exit signal and shut down its respective internal consumer process (thereby preventing new requests from being consumed). Each old instance of call processing service then shuts downs any remaining auxiliary processes, for example auxiliary processes handling other applications, terminating that instance of the call service.

Any group call request that was delivered to an old instance of call processing service, but not processed, will be unacknowledged. The message broker retransmits those unacknowledged requests to the new instances, in a distributed fashion, as previously described.

The combination of the database locking/unlocking and storing of group call states in the database in conjunction with the message broker acknowledgements and retransmission of unacknowledged group call requests advantageously allow for call service upgrades to take place without loss of service and dropped group calls.

Figure 3:
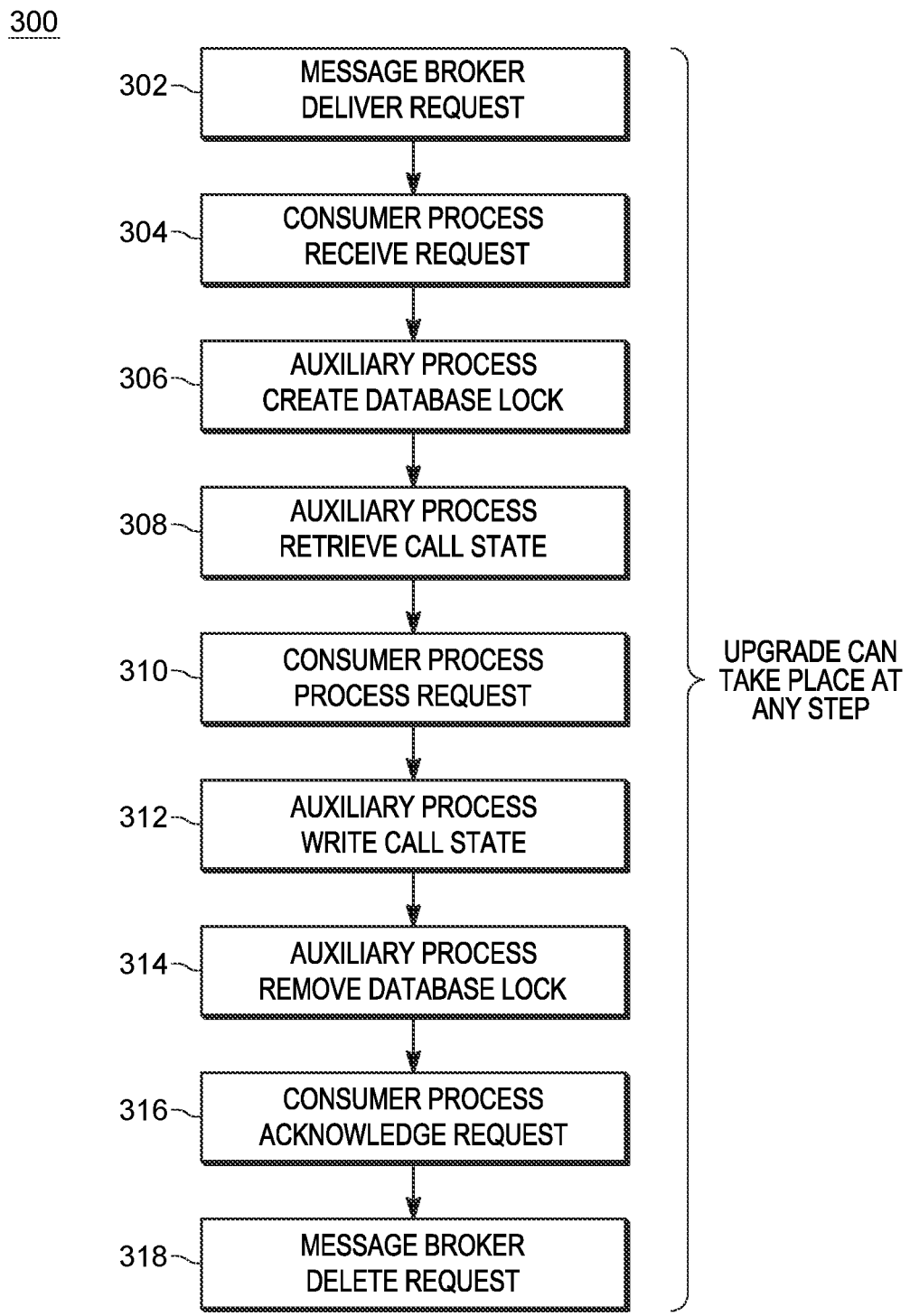
FIG. 3 is a flow chart in accordance in accordance with some embodiments.

FIG. 3 is a flowchart of a method 300 for processing group call requests in accordance with some embodiments. At 302, a message broker, such as message broker 201 of FIG. 2, delivers a group call request to an internal consumer process of a call processing service instance, such as internal consumer process 213 of call processing service 203 of FIG. 2. In accordance with an exemplary embodiment, the broker may deliver a plurality of different group call requests to different call processing service instances in a round-robin fashion ensuring load balancing between the instances. The internal consumer process 213 receives the group call request at 304.

An internal auxiliary process, such as from internal auxiliary processes 223 of FIG. 2, creates a database lock at 306. For example, when call processing service 203 of FIG. 2 processes a group call request, it will first create a distributed lock in database 205, preventing other instances, such as call service 202 or 204, from altering the state of the same call.

At 308, the internal auxiliary process retrieves a group call state stored within the database.

At 310, the internal consumer process 213 processes the group call request. For example processing the group call request comprises verifying the ID of the user starting the call and the ID of the group that the user is trying to talk into.

At 312, the auxiliary process 223 writes an updated group call state to the database.

For example: an endpoint device from FIG. 1 may be sourcing audio into a talkgroup, and then another endpoint device may interrupt the former; the information about who is currently sourcing audio is stored in the state as an update to that group call state.

At 314, the auxiliary process 223 removes the database lock. At 316, the consumer process 213 then acknowledges that the group call request has been processed, the acknowledgement being back to the message broker. At 318, the message broker 201 deletes the group call request to remove the message from the message broker's queue.

An upgrade to the call processing service can take place at any point within method 300. The use a lock at the database advantageously enables multiple instances to operate in parallel which, in turn, enables the seamless upgrade.

Figure 4:
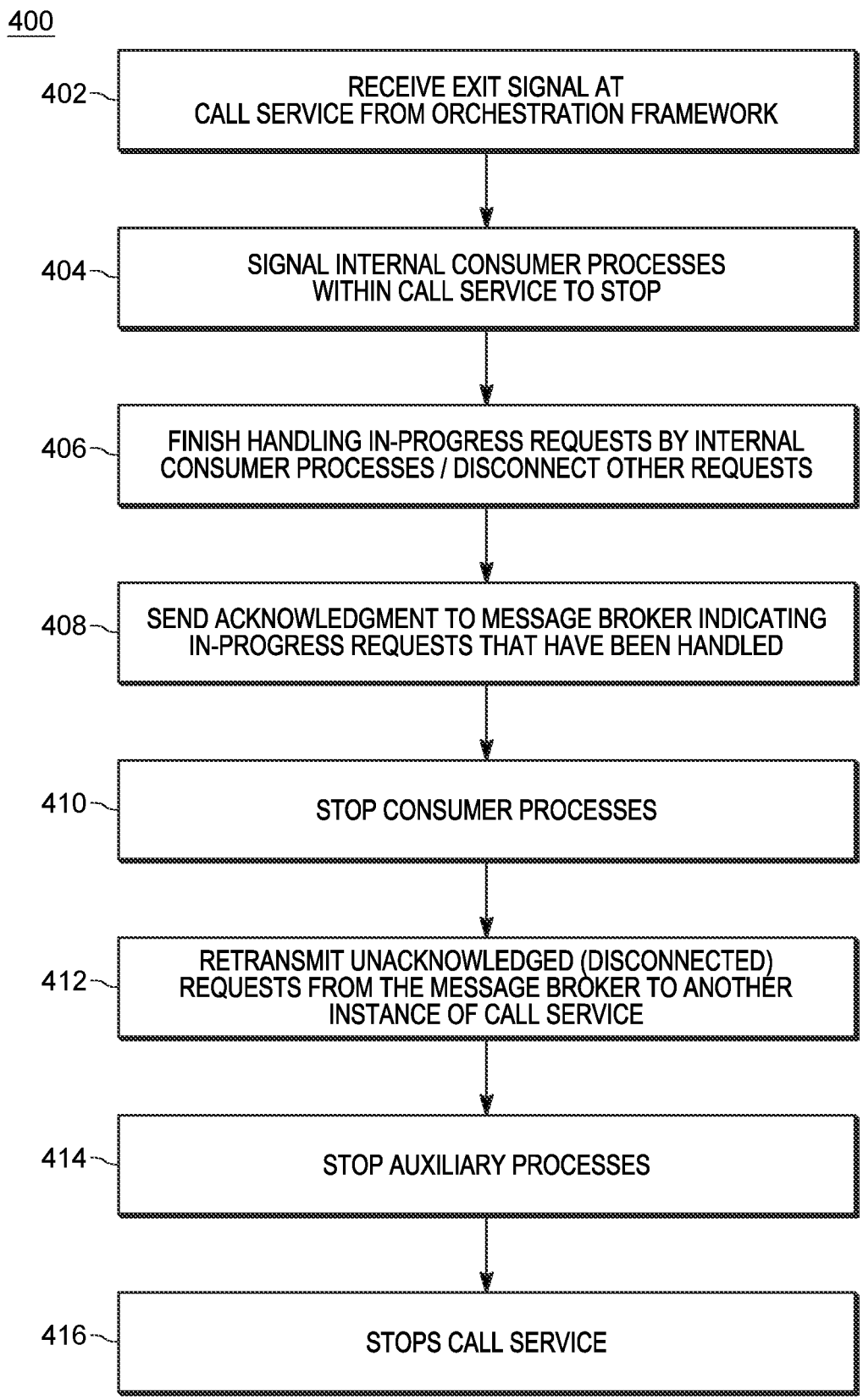
FIG. 4 is another flow chart in accordance in accordance with some embodiments.

FIG. 4 is a further flowchart of a method 400 in accordance with some embodiments. Method 400 preserves a group call state amongst endpoint devices 150 of FIG. 1 during a cloud-based call processing service upgrade. Beginning at 302, an exit signal is received from the orchestration framework at all instances of the call processing service, such as call processing services 202, 203, 204 of FIG. 2 which begins the shutdown process of those instances. The orchestration framework also starts new instances of identical call processing services.

The internal consumer process of each existing instance is notified of the shut down at 404, thereby triggering each existing instance to finish handling in-progress requests and cease consuming new group call requests by disconnecting from the queue at 206.

At 408, acknowledgement(s) are sent to the message broker indicating in-progress requests that have been handled, thereby removing any such requests from the queue. Unacknowledged or disconnected group call requests are stored and re-queued in the message broker. For example, ongoing requests will be acknowledged and requests received after the exit signal will remain unacknowledged. The internal consumer processes are then stopped at 410.

Unacknowledged or disconnected group call requests stored at the message broker are re-transmitted to the new instances of the call processing service at 412. Internal auxiliary processes of the existing call processing services are stopped at 414, which shutdown the call processing service at 416.

Hence, the system and method of the embodiments have provided the ability to preserve group call during an upgrade of call processing services with zero downtime. The approach is applicable to land mobile radio communication systems as well as next generation cloud-based multi-tenant, multi-system communication systems. Unlike past routing based approaches, the utilization of the message broker to queue groups call requests, remove group call request that have been handled, and re-transmit group call requests to new instance of call processing services advantageously maintains the preservation of the group call state during upgrades to call processing services.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot send unicast messages to each of the talkgroup members connected to a broadband network, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server, or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

We claim:

1. A method to preserve a group call state during a cloud-based call processing service upgrade in a communication system, the method comprising:
   distributing group call requests through a message broker to instances of a call processing service;
   selectively locking a cloud based database by the instances of the call processing service when a group call request is being processed with a group call state retrieved from the cloud based database;
   unlocking the database when the processing is complete;
   receiving an exit signal indicating a need to upgrade the call processing service;
   starting new instances of the call processing service;
   signaling internal processes of the instances of the call processing service to begin shutting down;
   completing processing of in-progress group call requests using the internal processes of the instances of the call processing service;
   writing updated group call states to the database upon the completion of processing;
   sending acknowledgments indicating completion of group call requests to the message broker;
   determining unacknowledged group call requests at the message broker;
   retransmitting the unacknowledged group call requests to the new instances of the call processing service; and
   terminating the instances of the call processing service.

2. The method of claim 1, wherein the group call requests are distributed through the message broker to instances of the call processing service in a round robin manner.

3. The method of claim 2, wherein the internal processes of each instance of the call processing service comprise:
   a consumer process; and
   auxiliary processes.

4. The method of claim 3, wherein:
   the consumer process is a message consuming process for processing a group call request; and
   the auxiliary processes are configured for locking the database, retrieving the group call state from the database, writing and storing the updated group call state to the database and removing the lock to the database.

5. The method of claim 4, wherein the upgrade is performed by an orchestration framework.

6. The method of claim 5, wherein the exit signal is sent by the orchestration framework to each of the instances of the call processing service.

7. The method of claim 6, wherein sending the acknowledgment that the processing of the group call request is complete removes that group call request from a queue of the message broker.

8. The method of claim 1, wherein the communication system is a land mobile radio communication system with push-to-talk (PTT) group call.

9. The method of claim 1, wherein the exit signal is sent by an orchestration framework;
   and the new instances of the call processing service are stated by the orchestration framework.

10. A cloud based communication system that preserves a group call state during a cloud-based call processing service upgrade, comprising
    instances of a call processing service, each instance of the call processing service having internal processes for processing a group call request;
    a message broker receiving a plurality of group call requests, the message broker distributing the plurality of group call requests to the instances of the call processing service;
    a database having group call states stored therein; and
    wherein the internal processes of each instance of the call processing service are configured to:
      receive a group call request;
      apply a lock to the database;
      retrieve a group call state from the database;
      process the group call request as an in-progress group call request;
      receive an exit signal indicative of a service upgrade;
      complete processing of the in-progress group call request;
      write an updated group call state to the database upon the completion of processing of the group call request;
      acknowledge the completion of processing of the group call request to the message broker;
      cease consuming new group call requests;
      stop the internal processes of each instance of the call processing service; and
    wherein the message broker is configured to determine unacknowledged group call requests, and the message is further configured to retransmit unacknowledged group call requests to new instances of the call processing service.

11. The communication system of claim 10, wherein the internal processes of each instance of the call processing service comprises:
    a consumer process; and
    auxiliary processes.

12. The communication system of claim 11, wherein:
    the consumer process of each instance is a message consuming process for processing the group call request; and
    the auxiliary processes of each instance are configured for locking the database,
    retrieving the group call state from the database, writing and storing the updated group call state to the database and removing the lock to the database.

13. The communication system of claim 12, wherein the message broker has a message queue, the message queue for queuing the group call requests and distributing the group call requests to the instances of the call processing service in a round robin manner.

14. The communication system of claim 13, wherein the round robin distribution ensures load balancing.

15. The communication system of claim 10, wherein the communication system is a land mobile radio communication system with push-to-talk (PTT) group call.

16. The communication system of claim 10, wherein the exit signal is sent from an orchestration framework.

17. The communication system of claim 16, wherein the new instances of the call processing service are generated by the orchestration framework.

18. The communication system of claim 10, wherein the instances of the call processing service share a single queue defined in the message broker.

\* \* \* \* \*